May 16, 1961  R. H. DICKE  2,984,782
SPECTRUM ANALYZER
Filed Dec. 11, 1957  2 Sheets-Sheet 1

INVENTOR.
ROBERT H. DICKE
BY
ATTORNEY

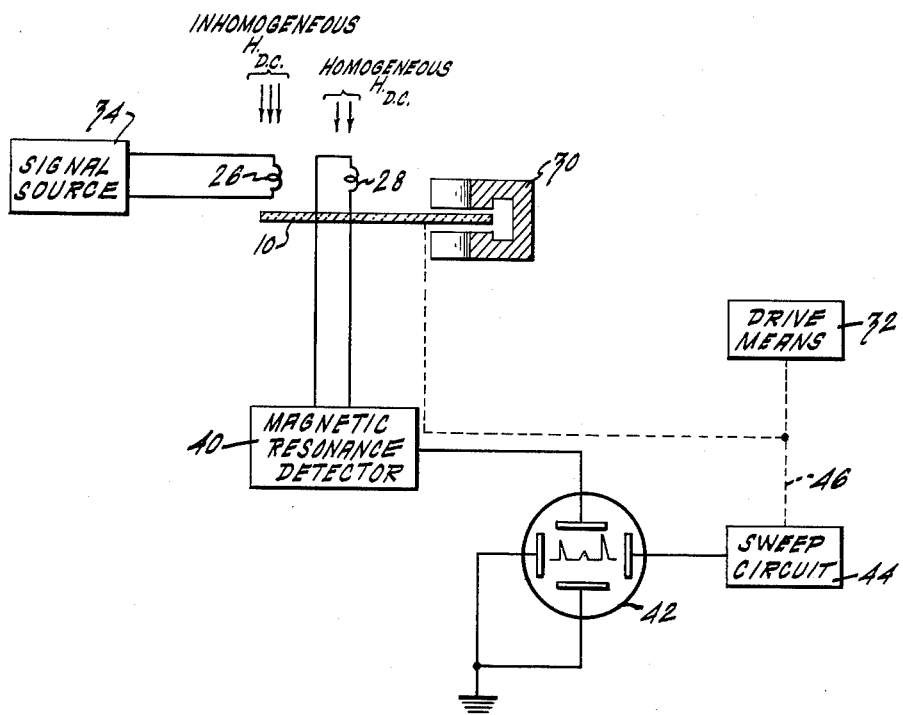

United States Patent Office 2,984,782
Patented May 16, 1961

2,984,782
SPECTRUM ANALYZER
Robert H. Dicke, 37 Jefferson Road, Princeton, N.J.
Filed Dec. 11, 1957, Ser. No. 702,041
6 Claims. (Cl. 324—.5)

The present invention relates to a new and improved circuit for determining the frequency components of an electrical signal.

According to the invention, the protons in a nuclear resonant medium are "magnetized" by applying a strong, direct, homogeneous magnetic field thereto. The medium may be water (a proton source) and it may be sealed in pores of a thin, rotatable ceramic disk. The medium is then moved from the homogeneous field and placed in a weaker, direct, inhomogeneous magnetic field varying in intensity between values $H_1$ and $H_2$, where $H_1$ corresponds to a nuclear precession frequency $f_1$ of the medium, and $H_2$ corresponds to a nuclear precession frequency $f_2$ of the medium. An alternating magnetic field which may have unknown frequency components within the band $f_1$–$f_2$ is applied to the same portion of the medium as the direct magnetic field and preferably at right angles to the direct magnetic field. These frequency components cause certain of the protons in the medium to precess and this lessens their static magnetization. The precession of the protons under the influence of an alternating magnetic field is known as proton resonance. The medium is then scanned, as, for example, by rotating the disk past the coil of a proton resonance detection circuit, and the portions of the disk the static magnetization of which have been reduced detected. The strength of the inhomogeneous, direct magnetic field at the portion or portions of the medium made resonant by the alternating magnetic field, is a measure of the frequency component of the magnetic field causing such resonance.

Figure 1:
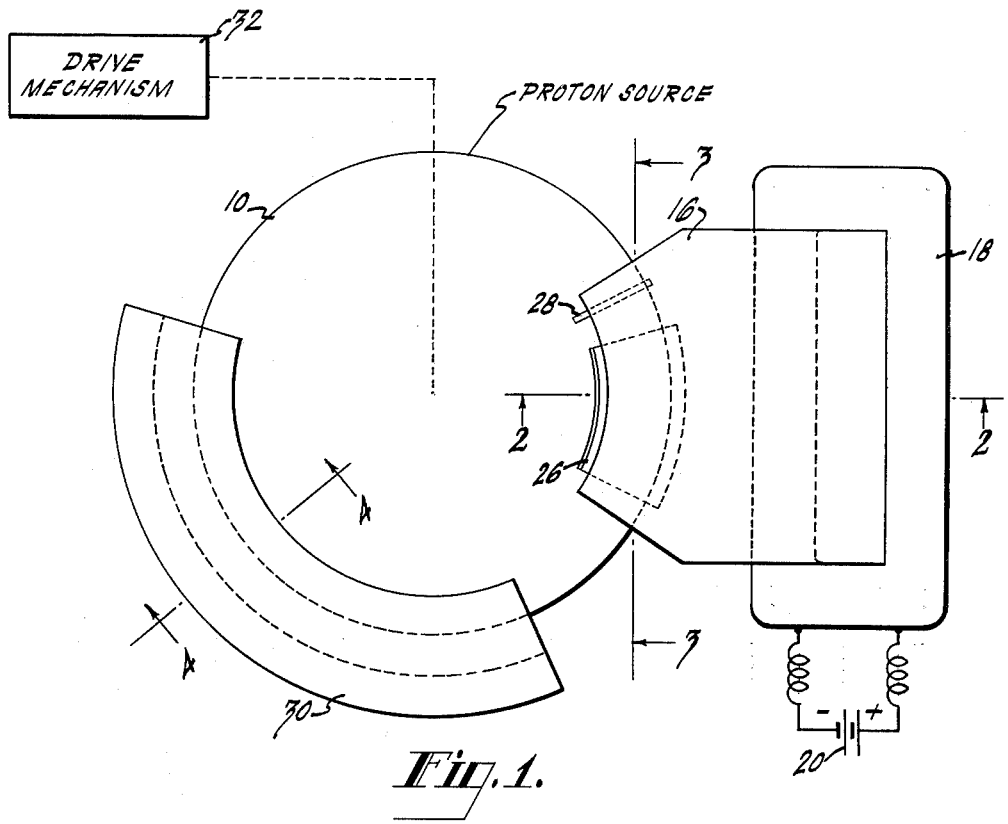
Figure 2:
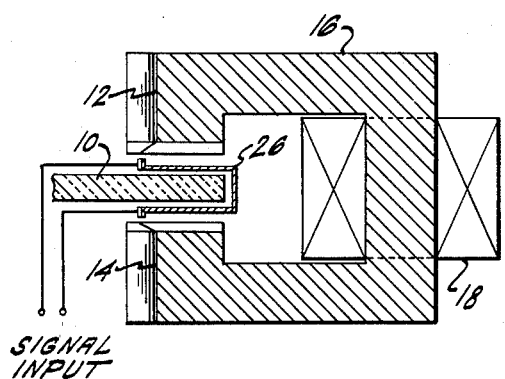
Figure 3:
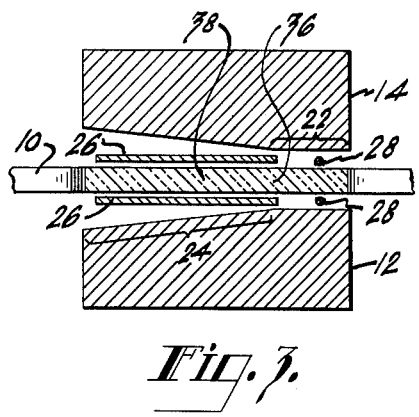

The invention will be described in greater detail by reference to the following description taken in connection with the accompanying drawing in which:

Fig. 1 is a plan view of a preferred form of the present invention;

Figs. 2, 3 and 4 are sections along lines 2—2, 3—3, and 4—4, respectively, of the arrangement shown in Fig. 1; and Fig. 5 is a block and schematic circuit diagram of the preferred form of the invention.

The magnetic moment ($\mu$) of an atomic nucleus may be expressed as $$\mu = \frac{fhI}{H} \quad (1)$$

where $f$ = the frequency of precession
$h$ = Planck's constant
$I$ = spin quantum number
$H$ = magnetic field intensity Of the five terms above, three are absolutely constant for any given material. In other words, for a material such as water, which is a proton source, we may write Equation 1 as $$f = Hq \quad (2)$$

where $q$ is a constant. Put into words, the frequency at which an atomic nucleus can be made to precess is directly proportional to the strength of the direct magnetic field applied to the material. It is also apparent from the equation above that for a given direct magnetic field intensity, there is only a single frequency (actually an extremely narrow band of frequencies) at which precession will occur.

If Equation 2 is solved for $q$, for a substance such as water (a proton source), it is found that $q=4270$. Accordingly, with a field strength of about 7000 gauss, the precession frequency is about 30 megacycles. With a magnetic field strength of about 2300 gauss, the precession frequency is about 10 megacycles.

When a nuclear resonant molecule is made to precess, it continues to precess for a relatively long interval of time. The time during which precession continues, after the exciting source is removed, is known as the relaxation time. For a substance such as water, the relaxation time may be on the order of 1–10 seconds, for example.

Referring to Figs. 1–4, a nuclear resonant source such as water is sealed in the pores of a preferably highly porous ceramic disk 10. Water is a source of protons for proton nuclear magnetic resonance. The pole pieces 12, 14 of a magnet 16 are positioned one on each side of an edge portion of the ceramic disk 10. Magnet 16 may be a permanent magnet. However, it is shown as an electromagnet which is maintained magnetized by a coil 18 supplied with direct current from source 20.

As is best seen in Fig. 3, the pole pieces have a constant spacing in the region 22 and a varying spacing in the region 24. In the latter region, the spacing between the two pole pieces preferably increases linearly along the length of the pole pieces, however, this is not an essential feature of the invention, as will be explained in greater detail below. The direct magnetic field applied by the portion 24 of the magnet 16 is inhomogeneous. In the arrangement shown, it decreases in the direction toward the bottom of the magnet, as viewed in Fig. 1, in view of the increased spacing between pole pieces in this direction. The magnetic field applied by a portion 22 of the magnet is uniform along the length of portion 22.

Member 26, which is located in the inhomogeneous magnetic field, comprises a relatively large, sheet copper loop. The input radio frequency wave, the frequency components of which are to be determined, is applied to loop 26. Member 28 comprises a loop of thin wire. It is located in the uniform magnetic field adjacent to portion 22 of the magnet. Proton resonance is detected by this loop.

A second magnet 30, which is substantially larger in size than magnet 16 is arranged with its pole pieces surrounding a different edge portion of the ceramic disk. This magnet, like magnet 16, may be either a permanent magnet or an electromagnet, however, a permanent magnet is shown. As will be explained in more detail later, magnet 30 produces a magnetic field which is of substantially greater intensity than the magnetic field produced by magnet 16.

Drive mechanism 32, shown as a single block, is mechanically coupled to the ceramic disk 10. It may consist of a constant speed motor, gears and cams. The function of the drive mechanism is to intermittently drive the ceramic disk through a given angle in a relatively short interval of time and to maintain the disk stationary, between the driving intervals, for somewhat longer intervals of time.

Referring to Figs. 1, 3 and 5, in operation, the disk is first maintained stationary and the strong magnetic field produced by magnet 30 allowed to act on the protons in the disk adjacent the magnet 30. The protons in the disk, when permitted to remain in the strong direct field of magnet 30 for a length of time preferably greater than their relaxation time, become magnetized. Note in this connection that the protons are capable of alignment in two directions only, one of the directions being 180° out of phase with the other. In the absence of an applied magnetic field, approximately the same number of protons are aligned in one direction as in the other. However, in the presence of a strong field, such as produced by 30, more of the protons become aligned in one direction than in the other.

The amount of magnetization produced in a proton sample by an applied magnetic field is $$\frac{n_2}{n_1} = e \exp.\left(\frac{-hf}{kT_s}\right) = e \exp.\left(\frac{-2\mu H}{kT_s}\right) \quad (3)$$

where:

$n_2$ = the number of protons orientated in one direction
$n_1$ = the number of protons orientated in the other direction (note that $n_1$ is greater than $n_2$)
$h$ = Planck's constant
$f$ = the precession frequency
$k$ = Boltzmann's constant = $1.37 \times 10^{-16}$ erg deg.$^{-1}$
$T_s$ = spin temperature
$\mu$ = magnetic moment of proton
$H$ = magnetic field strength After the protons in a portion of the disk have become "magnetized," they are moved between the halves of coil 26 and allowed to remain there for a period less than the relaxation time. A radio frequency signal, the frequency components of which are to be analyzed, is applied from signal source 34 to coil 26. The signal source may be at a frequency of approximately 30 megacycles and may include components which differ from 30 megacycles by relatively small values—in the audio frequency range, for example. Such a signal may be available, for example, as the output of a Doppler radar system. Alternatively, an audio frequency signal to be analyzed may be modulated onto a 30 megacycle carrier wave to produce a signal having components the frequencies of which are to be determined.

As mentioned previously, portion 24 of magnet 16 produces an inhomogeneous direct magnetic field. The strength of the field is lower than that produced by magnet 30. The radio frequency signal applied to coil 26 produces an alternating magnetic field at right angles to the inhomogeneous direct magnetic field. Since the direct magnetic field is inhomogeneous, successive portions of the disk along the length of coil 26 are capable of being made resonant at different precession frequencies. The portions of the disk between the closest spaced portions of the magnet are immersed in the magnetic field of high strength and the precession frequencies at these portions of the disk are therefore of highest value (see Equation 2). The reverse is true for the portion of the disk immersed in the weaker magnetic field, that is, the magnetic field between the furthest spaced portions of pole pieces 12, 14.

If the signal applied to coil 26 includes different frequency components within the limits discussed above, the resulting alternating magnetic fields cause precession of protons at different places along the disk. For example, precession at portion 36 of the disk (Fig. 3) may correspond to an input signal at 30 megacycles minus 50 megacycles, and precession at 38 may correspond to an input signal at 30 megacycles minus 200 cycles. This precession is known as proton resonance. When precession of a proton occurs, its static magnetization (the magnetization imparted previously by magnet 30) decreases. In other words, the vector component of the static magnetic field of the proton changes its direction and, as a matter of fact, may actually turn over and face the opposite direction. The change in vector direction means a decrease in the projected length of the vector in the static magnetization direction and, in some cases, a change in the sign of the vector.

A decrease in static magnetization is defined in Equation 3 as an increase in $n_2/n_1$ and a corresponding increase in spin temperature $T_s$. Thus, at each place on the disk that proton resonance occurs, the spin temperature of the proton sample is increased. This causes these places on the disk to be less able to respond to a future magnetic resonance.

After the frequency spectrum of the incoming signal has been "burned into" the protons on the disk, the disk is rotated, preferably at a uniform speed, through an angle sufficient to move the entire disk area which was formerly between the halves of coil 26 past coil 28. Coil 28 is in the uniform field of magnet 16. It is excited by the correct frequency (say 30 megacycles) to induce nuclear resonance during the readout. Note in this connection that those portions of the disk at increased spin temperature have substantially smaller amounts of nuclear resonance induced than the remaining portions of the disk.

Referring to Fig. 5, coil 28 is shown connected to a magnetic resonance detector 40. Any one of a number of standard circuits well-known in the art may be employed. The signals detected by coil 28 which correspond to the portions of the disk at increased spin temperatures, may be applied to the vertical deflection plates of a cathode ray tube indicator shown schematically at 42. A sawtooth sweep may be applied to the horizontal deflection plates of the indicator from sweep circuit 44. The latter is preferably synchronized by the drive means 32 as indicated by the mechanical connection 46. The display is as shown in Fig. 5. Each pip is indicative of an input signal of different frequency. The amplitude of each pip is indicative of the strength of the input signal.

The circuit of Fig. 5 may readily be calibrated by applying to coil 26 input signals of known frequency. A scale may then be marked on the oscilloscope screen, and the frequency components of the wave read off directly. If the inhomogeneous magnetic field varies linearly along the length of the pole pieces, the scale along which the frequency components are displayed will also be linear. However, if it is desired to show, in expanded form, the frequency components at one portion of the spectrum, the spacing between the pole pieces may be made to change more gradually at one portion thereof than another.

In a practical circuit of the type described above, the field strength of magnet 30 may be on the order of 20,000 gauss or so and the field strength of magnet 16 may be about 7000 gauss at the closest spacing between pole pieces. The system may be operated sequentially with perhaps 90% of the time being devoted to accepting information and 10% of the time used to readout the audio spectrum of the previous period.

In a typical operation, the disk may rest for approximately one-fifth of a second. During this time, the frequency spectrum of the incoming signal is burned into the protons on the disk. The disk may then be rotated uniformly through about 50° in roughly one-fiftieth of a second. During this time, the previously exposed proton sample sweeps by the proton resonance coil 28. The time during which the disk is at rest plus the time during which it sweeps past coil 28 are together less than the relaxation time of the protons. Magnet 30 is made sufficiently large so that a portion of the disk later energized by coil 26 spends several times as much time between the pole pieces of magnet 30 as between the pole pieces of magnet 26. Preferably, the length of magnet 30 compared to that of coil 26 is such that the portion of the disk later energized by coil 26 spends a period of time greater than the proton relaxation time under the influence of magnet 30.

The present invention is applicable to nuclei other than those of hydrogen. For example, it is applicable to nuclei such as listed in the "Review of Modern Physics," volume 18, Number 3, page 348, July 1946.

What is claimed is:

1. A spectrum analyzer comprising a nuclear resonance medium; means for initially uniformly magnetizing a length of said medium; means for then applying to said medium a direct magnetic field which linearly varies in intensity along said length thereof between a limit $H_1$ which corresponds to a precession frequency $f_1$ of said medium, and another limit $H_2$ which corresponds to a precision frequency $f_2$ of said medium; means for simultaneously applying an alternating magnetic field to said length of said medium at an angle to said direct magnetic field and having frequency components within the band $f_1$–$f_2$; and means for then scanning said length of said medium and detecting changes in the static magnetization along said length for indicating the frequency spectrum of said applied alternating field.

2. A spectrum analyzer as set forth in claim 1 in which the last-named means comprises a nuclear resonance coil immersed in a direct, homogeneous, magnetic field, and means for moving the portion of said medium within both said direct and alternating magnetic field out of said two fields and past said coil.

3. In combination, a relatively thin disk of material which includes a nuclear resonance medium; magnet means formed with pole pieces defining a gap within which one edge portion of said medium is located, the spacing between said pole pieces varying to an extent sufficient to produce a magnetic field in said gap the intensity of which varies between limits $H_1$ and $H_2$, where $H_1$ corresponds to a precession frequency $f_1$ of said medium and $H_2$ corresponds to a precession frequency $f_2$ of said medium; a sheet metal coil comprising a single loop which surrounds one edge portion of said medium, said coil being located in said gap and being adapted to receive an input signal having frequency components within the band $f_1$–$f_2$; magnet means having uniformly spaced pole pieces defining a gap within which another edge portion of said medium is located; a pickup coil of relatively small dimensions located in said last-named gap adjacent to said disk; and means for maintaining said disk in a stationary position for a relatively long interval of time during the application of an input signal to said sheet metal coil, and then rapidly moving the portion of said disk between the first mentioned pole pieces past said pickup coil.

4. In the combination as set forth in claim 3, the two magnet means set forth comprising a single magnet the pole pieces of which are at a uniform spacing from one another at a relatively small end portion of said pole pieces, and the remainder of said pole pieces having a non-uniform spacing between one another.

5. In the combination as set forth in claim 3, said non-uniform spacing varying linearly along the length of said pole pieces.

6. In the combination as set forth in claim 3, further including additional magnet means having pole pieces which are substantially larger than those of said first and second mentioned magnet means and having a uniform spacing from one another, said pole pieces defining a gap within which a third edge portion of said disk is located, said additional magnet means producing a magnetic field having a strength which is substantially greater than that produced by said first and second mentioned magnet means.

References Cited in the file of this patent

UNITED STATES PATENTS

| | | |
|---|---|---|
| 2,705,790 | Hahn | Apr. 5, 1955 |
| 2,721,970 | Levinthal | Oct. 25, 1955 |
| 2,820,944 | Bradley | Jan. 21, 1958 |